3,423,657
TAP CHANGER CONTROL
John C. Ponstingl, Rocky River, and Joseph F. Valvo, Fairview Park, Ohio, assignors to Westinghouse Electric Corporation, Pittsburgh, Pa., a corporation of Pennsylvania
Filed May 20, 1966, Ser. No. 551,704
U.S. Cl. 318—33         10 Claims
Int. Cl. G05b 13/00

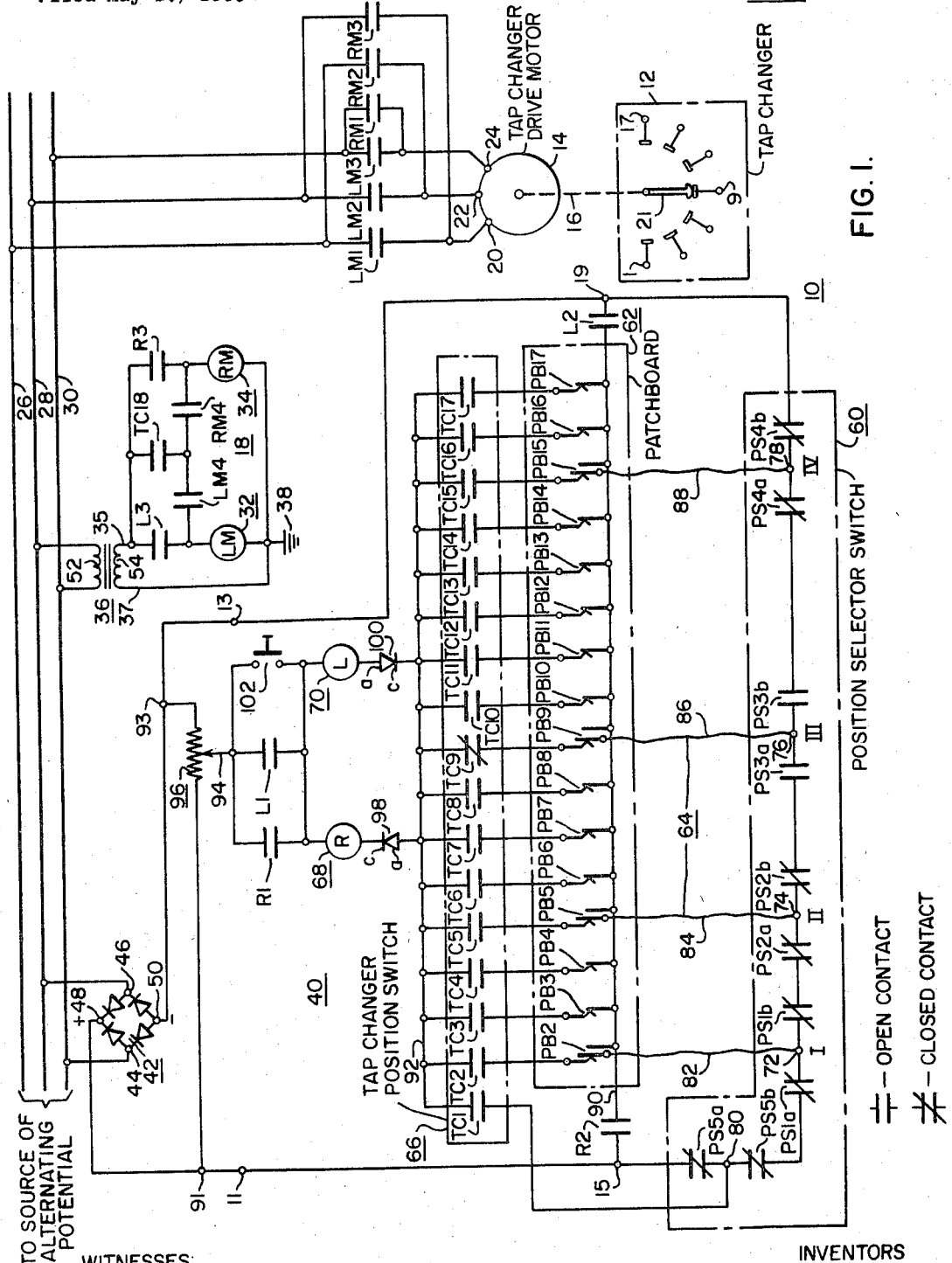
FIG. I.
INVENTORS
John C. Ponstingl &
Joseph F. Valvo.
BY
Donald R. Lackey
ATTORNEY

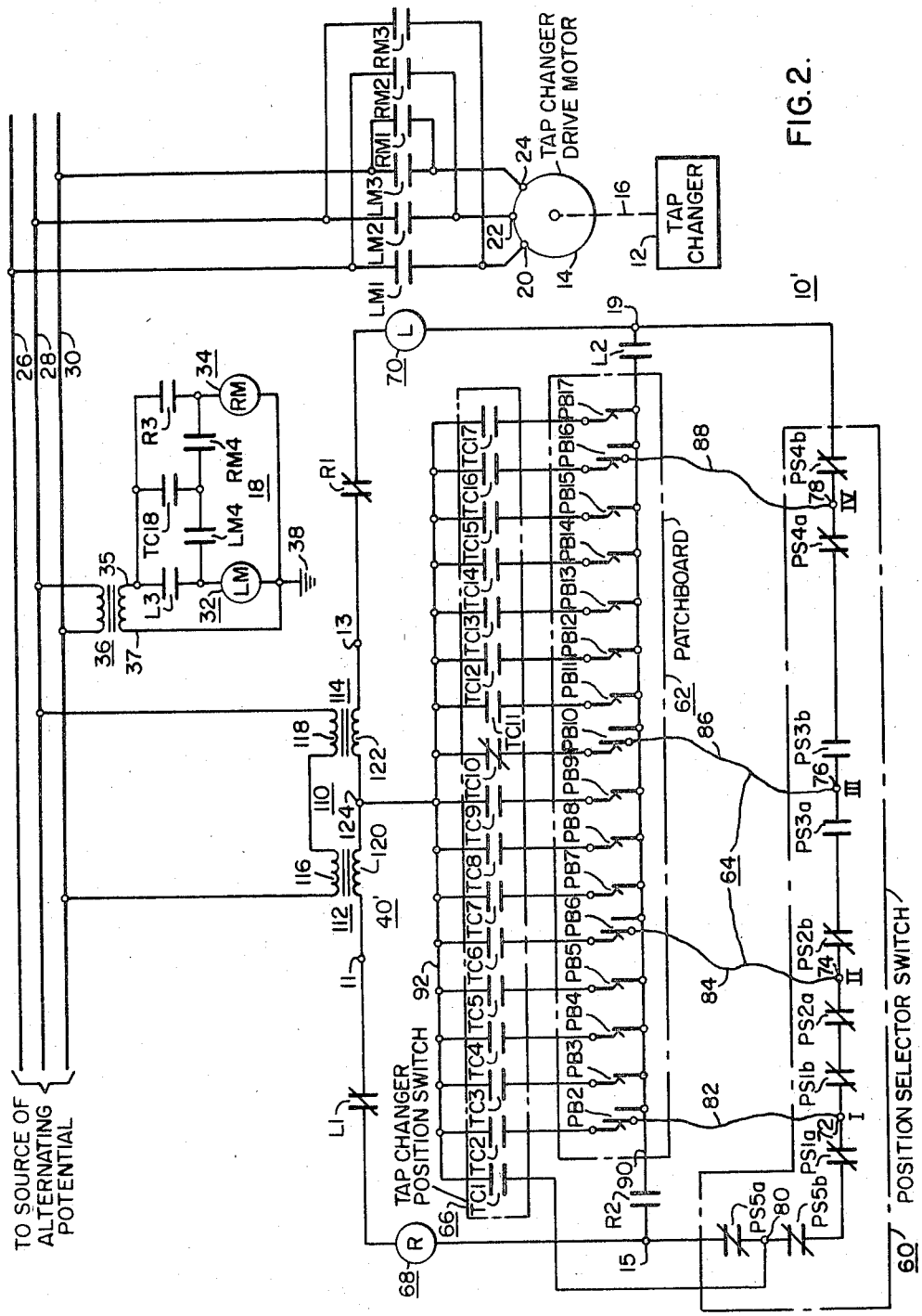

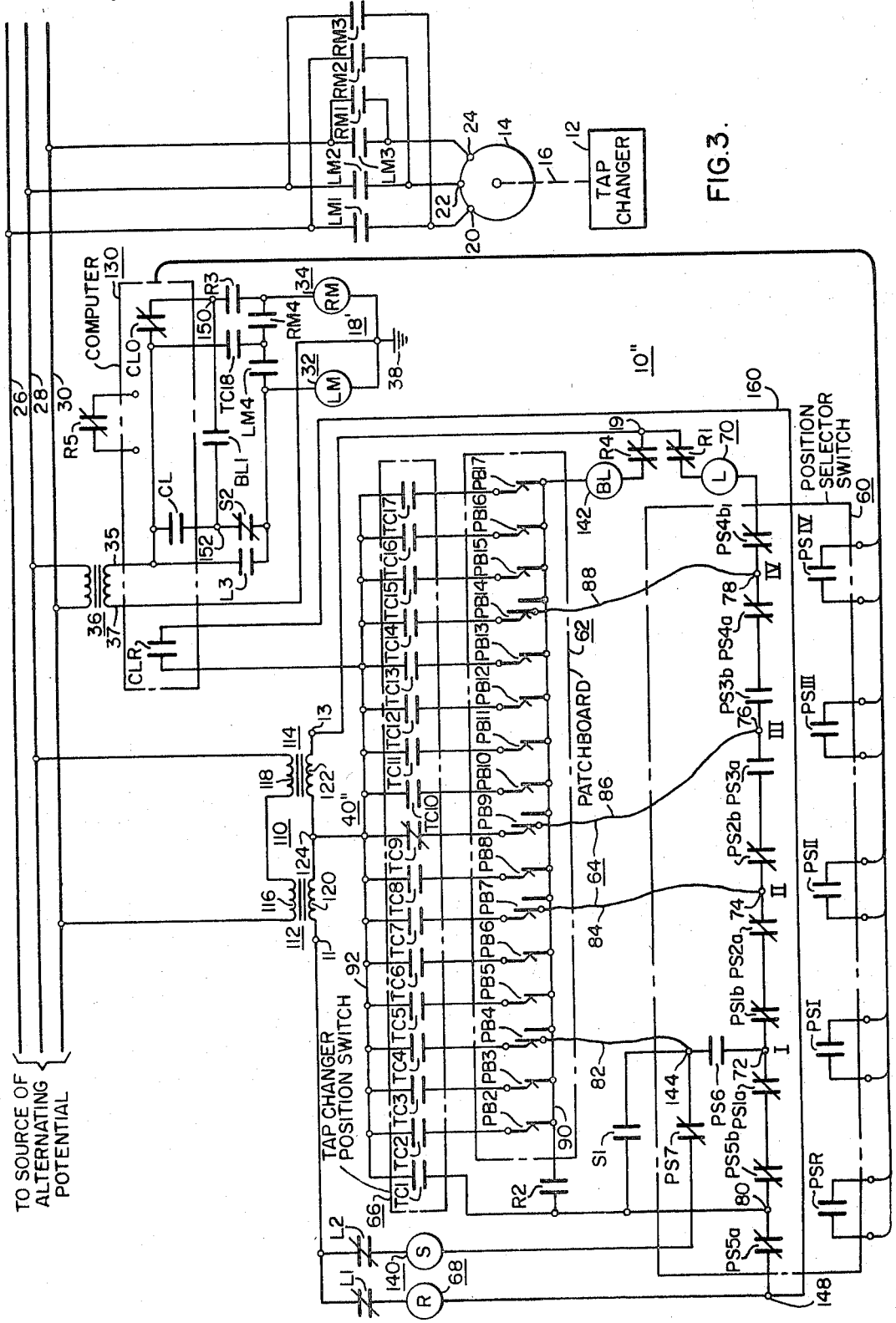

ABSTRACT OF THE DISCLOSURE

A tap changer servo system which automatically drives a tap changer in the proper direction to effect a demanded tap change, and stops the tap changer upon reaching the selected tap position. The servo system may be operator or computer controlled.

---

This invention relates in general to electrical tap changer control apparatus, and more particularly to a tap changer servo system which will automatically connect a selected tap position into a predetermined electrical system.

Certain electrical applications require precise adjustable control of voltage magnitude. For example, electric arc furnaces must have the flexibility of allowing operation at any one of a plurality of voltage levels, in order to perform such functions as "holding," "refining," "bore down," "clean bottom," and "melt." Thus, selector means having a predetermined number of positions corresponding to predetermined voltage levels is provided for the operator of the electric arc furnace.

In addition to having a predetermined number of selectable voltage positions, it is desirable that the voltage level of each selector position be capable of being adjusted by the operator. Selector means having a predetermined number of positions, and tap changer means having a large plurality of contact positions may be used to provide the voltage control desired. Each position of the selector means should be connected to select a different contact position of the tap changer, and the tap changer contact positions selected by each selector position of the selector means should be easily adjustable by the operator.

The control or servo system for actuating the movable contact means on the tap changer relative to its plurality of stationary contacts, in order to change taps on an electrical winding in response to the operator's selection, should automatically drive the movable contact means of the tap changer in the direction of the selected stationary contact, and the movable contact means should stop when it has engaged the selected stationary contact of the tap changer means. Thus, when the operator desires to change the operating voltage level to a different magnitude, either higher or lower than the existing voltage level, the operator selects the desired new position on the selector means, and the servo system should automatically sense in which direction the movable contact means of the tap changer should be driven to attain the newly selected position, and it should stop the tap changer drive once the movable contact is in engagement with the stationary contact selected by the operator.

The servo should be uncomplicated and use rugged, relatively inexpensive components, in order to provide a low cost, reliable system. Also, the means for selecting which stationary contact position of the tap changer will be responsive to each of the positions on the operator's selector switch means, should be uncomplicated, reliable, and quickly adjustable, to facilitate the operator selection. Further, the servo control system should be adaptable to computer demand control, with the transition from operator to computer control, and from computer to operator control, being easily and reliably accomplished by the operator. Further, the servo system should be interlocked to prevent the computer from driving the tap changer below the lowest tap position, and above the tap position selected by the operator's selector switch.

Accordingly, it is an object of the invention to provide a new and improved tap changer control system.

Another object of the invention is to provide a new and improved tap changer control system which will automatically drive the movable contact means of the tap changer in the proper direction to achieve a newly selected voltage level.

A further object of the invention is to provide a new and improved tap changer control system which will automatically drive the movable contact member of a tap changer to the stationary contact position corresponding to a selected position on an operator's selector switch, with the stationary contact position associated with each position of the operator's selector switch being quickly and easily changed.

Still another object of the invention is to provide a new and improved tap changer control system which may be controlled by an operator or by a computer, with the transition between the two methods of control being quickly and reliably controlled by the operator.

A further object of the invention is to provide a new and improved tap changer control system which may be controlled by an operator or by a computer, and which includes means for limiting the operation of the computer between predetermined tap positions on the tap changer.

Briefly, the present invention accomplishes certain of the above cited objects by providing a servo system for a tap changer, which utilizes patchcords and a patchboard to provide an adjustable selection of the tap changer stationary contact position for each of the selector positions on an operator's selector switch. A tap changer position switch, responsive to the mechanical position of the movable contact member of the tap changer, a patchboard and patchcords, and the operator's selector switch, all cooperate to energize a "raise" relay, or a "lower" relay, which controls the direction of the tap changer drive means when the operator moves the operator's position selector switch to a new position. The particular relay selected depends upon whether the tap change is to be made to a higher or lower tap than that associated with the previously selected stationary contact position on the tap changer.

Further objects and advantages of the invention will become apparent from the following detailed description, taken in connection with the accompanying drawings, in which:

FIGURE 1 is a schematic diagram of a servo control system for a tap changer, illustrating an embodiment of the invention in which the servo loop utilizes a direct current potential;

FIG. 2 is a schematic diagram of a servo control system for a tap changer, illustrating an embodiment of the invention in which the servo loop utilizes an alternating potential; and FIG. 3 is a schematic diagram of a servo control system for a tap changer, which is adapted for either operator or computer control.

Referring now to the drawings, and FIG. 1 in particular, there is illustrated a tap changer system 10, constructed according to a first embodiment of the invention. This embodiment of the invention utilizes a source of direct current potential for at least a portion of the circuit operations.

More specifically, the tap changer system 10 includes a tap changer 12, which has a movable contact member 21 and a plurality of stationary contacts, which in this instance are numbered from 1 through 17, with only a few of the contacts being shown for purposes of simplicity. As used throughout the specification the lowest numbered tap position is connected to the lowest voltage tap on an electrical winding, and the highest numbered tap position is connected to the highest voltage tap on the winding. The tap changer system also includes tap changer drive means 14 for driving the movable contact member 21 of tap changer 12, starter means 18 for the tap changer drive means 14, and a servo control loop 40. The tap changer 12 may be of any suitable construction, with the movable contact means 21 moving successively from stationary contact to stationary contact, in a direction to raise the voltage of the associated electrical apparatus, or in the opposite direction to lower the voltage, in response to the rotational direction of the tap changer drive means 14. Tap changer drive means 14 may be connected to actuate the movable contact means 21 through a suitable drive shaft 16. Tap changer 12 is shown in very simple form, as the tap changer itself does not form a part of the invention. For example, the tap changer may have two main selector switches which move in engagement with the stationary contacts, and may also include transfer switches and a preventive auto transformer, as well known in the art.

Tap changer drive means 14 may be of any suitable type, such as the three-phase alternating current motor shown in FIG. 1, which has input terminals 20, 22 and 24 connected to a source of alternating potential, represented by electrical conductors 26, 28 and 30. Drive means 14 is connected to conductors 26, 28 and 30 through contacts LM1, LM2, and LM3, and also through contacts RM1, RM2, and RM3 of starter 18. When starter contacts LM1, LM2, and LM3 close, tap changer drive motor 14 rotates in a direction to connect movable contact member 21 to a stationary contact connected to a lower voltage tap on the associated electrical winding. When starter contacts RM1, RM2, and RM3 close, two of the electrical phases connected to drive motor 14 are switched, reversing the direction of the motor and driving tap changer movable contact means 21 to stationary contacts associated with higher voltage taps on the electrical winding.

Starter 18 for tap changer drive motor 14 may be of any suitable construction, and is responsive to "raise" and "lower" relays which are connected in servo control loop 40. For example, starter 18 may include a relay 32 having an electromagnetic coil LM, contacts LM1, LM2, and LM3 connected between tap changer drive means 14 and electrical conductors 26, 28 and 30, and a contact LM4. Starter 18 also includes relay 34 having an electromagnetic coil RM, contacts RM1, RM2, and RM3 connected between tap changer drive motor 14 and electrical conductors 26, 28 and 30, and a contact RM4. Electromagnetic coils LM and RM of relays 32 and 34 are connected between a source of potential 36 and ground 38 through contacts L3 and R3, respectively, associated with the "lower" and "raise" relays in servo loop 40. Source of potential 36 may be a control transformer having a primary winding 52 connected to the source of alternating potential, and a secondary winding 54 connected to the starter 18 through conductors 35 and 37.

When servo loop 40 calls for the tap changer to drive movable contact member 21 to a stationary contact member associated with a lower tap on an associated electrical winding, contact L3 will close to energize starter relay coil LM, closing contacts LM1, LM2, and LM3, which energizes tap changer drive motor 14 to drive tap changer 12 in the "lower" direction. To insure that once tap changer 12 starts to change the position of movable contact member 21, that the movable contact member will complete the change to a new stationary contact position regardless of the signal from servo loop 40, a cam operated contact TC18, responsive to the mechanical position of movable contact member 21, closes whenever movable contact member 21 is not squarely on a stationary contact position. Contact LM4 also closes when relay coil LM is energized, which provides a complete circuit from the control transformer 36 to ground 38 through relay coil LM which is independent of the contact L3. Thus, if contact L3 opens during a tap change, tap changer drive 14 will continue to drive tap changer 12 until the tap change has been completed and contact TC18 opens.

When servo loop 40 calls for tap changer 12 to move movable contact member 21 to a stationary contact position associated with a higher voltage tap, contact R3 will close. When contact R3 closes, relay coil RM will be energized, closing its contacts RM1, RM2, RM3 and RM4. When contacts RM1, RM2 and RM3 close, drive means 14 will be energized, driving movable contact means 21 in the "raise" direction. When tap changer 12 starts to move, cam responsive contact TC18 will close, sealing in relay coil RM through contact RM4 for at least one complete tap change. If at the end of one complete tap change, contact R3 is still closed, the drive 14 will continue to operate tap changer 12, and cam operated contact TC18 will again close to insure that the tap changer drive will not stop until the next tap change is completed.

The servo loop 40, which operates contacts L3 and R3 in the starter 18 is powered, in this embodiment of the invention, by a direct current potential connected to terminals 11 and 13 of servo loop 40. The direct current potential may be obtained in any suitable manner, such as by the single-phase full-wave bridge rectifier 42 shown in FIG. 1. Rectifier 42 has input terminals 44 and 46 connected to the source of alternating potential, represented by electrical conductors 28 and 30, and positive and negative output terminals 48 and 50, respectively.

Servo loop 40 includes an operator's position selector switch 60, a patchboard 62, a plurality of patchcords 64, a tap changer position switch 66, a "raise" relay 68 having an electromagnetic coil R and contacts R1, R2 and R3, and a "lower" relay 70 having an electromagnetic coil L and contacts L1, L2 and L3.

The operator's position selector switch 60 provides the function of allowing the operator, such as the operator of an electric arc furnace, to select any one of a plurality of stationary contacts on tap changer 12, and thus any one of a plurality of operating voltages of an electrical winding which is connected to tap changer 12. The number of positions on the operator's position selector switch 60 will depend upon the requirements of the particular application, with five positions being shown in FIG. 1 for purposes of example. Each position of the selector switch 60 includes a terminal, such as terminals 72, 74, 76, 78 and 80, with each terminal being connected between two normally closed contacts, such as contacts PS1a and PS1b connected to terminal 72, contacts PS2a and PS2b connected to terminal 74, contacts PS3a and PS3b connected to terminal 76, contacts PS4a and PS4b connected to terminal 78, and contacts PS5a and PS5b connected to terminal 80. Each pair of contacts associated with each terminal are closed, except when the selector switch 60 selects its associated terminal. For example, in FIG. 1, the selector switch 60 has selected terminal 76, and its associated contacts PS3a and PS3b are open. All of the other contacts are closed. Further, all of the contacts of the operator's position selector switch 60 are serially connected, with the series string of contacts being connected to the positive and negative terminals 48 and 50, respectively, of the source 42 of direct current potential.

If the terminals of the operator's selector switch 60 were to be permanently connected to select predetermined stationary contacts of tap changer 12, position selector switch 60 would have to have a large plurality of positions in order to provide the operator with flexibility of operation. On a tap changer with a large plurality of stationary contacts, this would complicate the selector switch and wiring, and substantially increase the cost of the tap changer control. It would be more desirable to provide a selector switch 60 having the minimum number of positions required for any particular application, and provide a simple but effective means for quickly changing the stationary contact position of tap changer 12 that each selector switch 60 is associated with. Thus, when an application arises that requires different voltage settings for the various positions of selector switch 60, the operator could quickly change the stationary contact position of the tap changer which are associated with each selector position on selector switch 60.

FIGURE 1 illustrates an arrangement which allows the stationary contact positions of tap changer 12 associated with each terminal or position of the selector switch 60 to be changed, by using a patchboard 62 and a plurality of patchcords 64. All but one of the terminals associated with the operator's selector switch 60 are provided with a patchcord, with a patchcord 82 being connected to terminal 72, a patchcord 84 being connected to terminal 74, a patchcord 86 being connected to terminal 76, and a patchcord 88 being connected to terminal 78. Terminal 80 is for reset purposes, which will be hereinafter explained. For purposes of explanation, terminals 72, 74, 76, and 78 are labeled position I, II, III and IV, respectively, in the various figures.

Patchboard 62 includes a common conductor or bus 90, which will be called the "carry-over bus," which is connected to terminal 15 and the positive terminal 48 of source potential 42 through contact R2 of relay 68, and to terminal 19 and negative terminal 50 of source potential 42 through contact L2 of relay 70. The carry-over bus 90, between relay contacts R2 and L2, is connected to a terminal on each of a large plurality of plug-in type receptacles. The plug-in receptacles are given the reference numeral PB and a number corresponding to the number of its associated stationary contact position on the tap changer means 12, as will hereinafter be explained. The plug-in type receptacles are preferably of the grounding type, such as a grounding type jack. The plug-in receptacles have normally closed first and second contacts, in the absence of a plug. When a plug is inserted into the receptacle, the normally closed contacts open and a normally open circuit is closed, made up of the first contact of the normally closed contacts and the plug. The second contact of the normally closed contacts of each of the plurality of receptacles is connected to carry-over bus 90, whose purposes will be hereinafter explained.

Assuming for purposes of example that the tap changer 12 has 17 stationary contacts, 16 plug-in receptacles will be provided on the patchboard 62, as one of the tap changer stationary contacts, in this instance, is associated with "reset" terminal 80 on the operator's selector switch 60, and is not available for selection purposes. Assuming that stationary contact position 1, the lowest voltage stationary contact associated with tap changer 12, is the stationary contact that is associated with the "reset" terminal 80, the plurality of plug-in receptacles will be given the reference numerals PB2 through PB17, with the number of each plug-in receptacle corresponding to the number of the tap changer stationary contact position that it is associated with.

In order to associate the jack or plug-in receptacles of patchboard 62 with the various stationary contact positions of the tap changer 12, a tap changer position switch 66 is provided, which has a contact, such as contacts TC1 through TC17, associated with each of the stationary contact positions 1 through 17 of the tap changer 12. Tap changer position switch 66 is responsive to the mechanical position of the movable contact member 21 of the tap changer 12, with contacts TC1 through TC17 being open, except when movable contact member 21 is in engagement with its associated stationary contact. As shown in FIG. 1, the movable contact member 21 of tap changer 12 is in engagement with stationary contact 9, signified by contact TC9 being closed. Tap changer position switch 66 may be cam operated, and associated with the drive means or shaft 16 of the tap changer drive motor 14.

One side of each of the contacts TC2 through TC17 is connected to the first contact of each of the plug-in receptacles PB2 through PB7, respectively. One side of contact TC1 is connected to terminal 80 of operator's selector switch 60. The remaining sides of contacts TC1 through TC17 are connected in common via bus 92.

The servo loop 40 is completed from the electrical bus 92 of tap changer position switch 66 through two parallel connected circuits, both of which are connected to source potential 42 through a tap connection 94 on resistor means 96, which has terminals 91 and 93 connected across the positive and negative output terminals 48 and 50, respectively, of source potential 42. Tap connection 94 on resistor means 96 is preferably a mid-tap. The first parallel connected circuit includes asymmetrically conductive device 98, electromagnetic coil R of relay 68, and contact R1 of relay 68. Asymmetrically conductive device 98, which may be a semiconductor diode having an anode electrode $a$ and a cathode electrode $c$, is poled to conduct current from electrical bus 92 to tap 94 of resistance means 96. The second electrical circuit between tap 94 of resistance means 96 and electrical bus 92 includes asymmetrically conductive device 100, electromagnetic coil L of relay 70, and contact L1 of relay 70. Asymmetrically conductive device 100 may be a semiconductor diode, similar to device 98, and is poled to conduct current from tap 94 on resistance means 96 to electrical bus 92. A momentary-make push button 102 is connected in parallel with the normally open contacts L1 and R1.

In the operation of the servo loop 40, assume patchcords 82, 84, 86 and 88 are connected to plug-in receptacles PB2, PB5, PB9 and PB15, respectively, as shown in FIGURE 1. Thus, the normally closed circuit through these plug-in receptacles to carry-over bus 90 is broken, and the first contacts of these receptacles are connected to terminals 72, 74, 76 and 78, respectively, of operator's selector switch 60. The operator's selector switch 60 is on position III, indicated by the open contacts PS3$a$ and PS3$b$ and terminal 76 is connected to plug-in receptacle PB9 through patchcord 86, and thus to contact TC9 on tap changer position switch 66. The tap changer is on stationary contact position 9, indicated by contact TC9 being closed. Thus, the operator has selected stationary contact position 9 on tap changer 12, and the tap changer 12 is on stationary contact position 9. If start button 102 is depressed, a circuit cannot be established through either relay coil R or L of relays 68 and 70, as a circuit from tap 94 of resistance means 96 through either relay coil would be completed only to terminal 76, and then would be isolated due to the open contacts on each side of terminal 76.

Now assume the operator desires to operate tap changer 12 on a stationary contact associated with a lower voltage tap on the associated electrical winding, for example on stationary contact position 2. The operator would move the selector switch 60 to position I, which causes contacts PS1$a$ and PS1$b$ to open, and the previously open contacts PS3$a$ and PS3$b$ to close. Since contacts PS3$a$ and PS3$b$ are now closed, an electrical circuit will be established when start button 102 is depressed, with the voltage applied to this electrical circuit being the voltage from tap 94 to terminal 93 of the resistance means 96. More specifically, when the operator changes the selector switch 60 to position I from position III and depresses start button 102, a circuit is completed from tap 94 of resistance means 96, through contact TC9, and through selector switch 60 to terminal 93 of resistance means 96. The open contacts PS1$a$ and PS1$b$ prevent the circuit from proceeding through selector switch 60 to terminal 91 of resistance means 96. Since tap 94 of resistance means 96 is more positive than terminal 93, current can only flow through asymmetrically conductive device 100, which energizes electromagnetic coil L of relay 70, closing contacts L1, L2, L3. Contact L1 seals relay coil L into the circuit, contact L2 connects carry-over bus 90 to terminal 93 of resistance means 96, and contact L3 energizes starter relay coil LM, which energizes tap changer drive means 14 and drives tap changer 12 in the "lower" direction. Tap changer position switch 66 preferably operates in closed transition, with one contact closing before the previously closed contact opens. Or, relays 68 and 70 may have delayed dropout times, in order to allow a short time between the opening of one contact and the closing of another on the tap changer position switch 66. Thus, with tap changer 12 being operated in a direction to engage the movable contact member 21 with stationary contacts associated with a lower voltage, the contacts of tap changer position switch 66 will close as its associated stationary contact is engaged by the movable contact member of the tap changer 12. When the movable contact member of tap changer 12 reaches stationary contact position 8, contact TC9 will open and contact TC8 will close. The circuit is maintained however, even though contact TC8 is not connected to the operator's position selector switch 60, through the carry-over bus 90 and the now closed relay contact L2, which connects the carry-over bus 90 to terminal 93 of resistance means 96. Thus, the function of carry-over bus 90 is to maintain the electrical circuit initially established through selector switch 60, when the tap changer moves to stationary contacts not associated with selector switch 60. When tap position 5 is reached, the circuit will be maintained through patchcord 84 and selector switch 60, as position II was not selected by the operator, and its associated contacts in the selector switch 60 are closed. Upon reaching the selected stationary contact position 2, contact TC2 will close, but the electrical circuit will now be open, as it will be isolated from either side of resistance means 96 by the open contacts PS1a and PS1b. Thus, servo system 40 will immediately respond to the operator's demand to change to a lower stationary contact position when start button 102 is pressed, and the tap changer drive will stop when the selected stationary contact position of the tap changer 12 is reached.

Instead of selecting a lower tap position than the seriously selected tap position 9, assume the operator had selected station IV, which is associated with stationary contact position 15 of the tap changer 12. Contacts PS4a and PS4b would then open and contacts PS3a and PS3b would close. When the operator depresses the start button 102, a circuit is completed through contact TC9 and contact PS3a, connecting the voltage across resistance means 96 from terminal 91 to tap 94 into the servo loop. The open contacts PS4a and PS4b isolate the selector switch 60 from terminal 93 of resistance means 96. In this instance, tap 94 of resistance means 96 is more negative than terminal 91, causing current to flow through asymmetrically conductive device 98, and through electromagnetic coil R of relay 68, causing contacts R1, R2 and R3 to close. Contact R1 seals relay 68 into the circuit, contact R2 connects the carry-over bus 90 to terminal 91 of resistance means 96, and contact R3 energizes starter coil RM of motor starter relay 34, closing its contacts RM1, RM2, RM3 and RM4. Tap changer drive means 14 is thus connected to conductors 26, 28 and 30, and it will rotate in a direction opposite to the direction it rotated previously, to drive tap changer 12 in the "raise" direction. Once the tap changer 12 leaves tap position 9, the circuit is maintained successively through contacts TC10, TC11, TC12, TC13 and TC14 through the carry-over bus 90 and the now closed relay contact R2. When tap changer 12 reaches tap position 15, the circuit will be broken, as it is isolated from carry-over bus 90 by the plug-in receptacle PB15, and from terminals 91 and 93 of resistance means 96 by the now open contacts PS4a and PS4b. Therefore, when the operator selects a higher tap position and presses the start button 102, servo loop 40 will automatically energize tap changer drive means 14 in the proper direction to effect the change, and will stop when tap changer 12 is on the newly selected stationary contact position. Thus, the servo loop includes first and second electrical circuits, with the voltage across one-half of the resistance means 96 being connected in the first circuit, and the voltage across the other half of resistance means 96 being connected in the second electrical circuit. The first electrical circuit includes relay means for driving the tap changer in one direction, and the second electrical circuit contains relay means for driving the tap changer in the opposite direction. The particular electrical circuit which is energized when the operator changes the selector switch 60 and pushes the start button, depends upon whether the newly selected stationary contact position is on the higher or lower side of the previously selected stationary contact position.

Now assume the operator wishes to connect one or more of the patchcords 64 to select different stationary contact positions on the tap changer 12. In order to connect tap changer 12 to a known circuit condition while the changes are being made, the operator first moves selector switch 60 to the "reset" position, corresponding to terminal 80 of selector switch 60. Contacts PS5a and PS5b will open, the previously open contacts will close, and when start button 102 is depressed, the servo loop will be connected to the voltage across resistor means 96 from its tap 94 to terminal 93, and as hereinbefore described, the tap changer 12 will be driven in the "lower" direction until stationary contact position 1 is reached, at which time the electrical circuit will be isolated by contacts PS5a and PS5b. A position indicator (not shown) on the operator's control panel, operated by a position indicator transmitter or selsyn in a manner well known in the art, notifies the operator when the tap changer is on the newly selected stationary contact position. One or more of the plugs connected to the patchcords 64 may then be removed from the receptacles on the patchboard 62, and inserted into the receptacles corresponding to the newly desired stationary contact positions of tap changer 12 which the operator wishes to be connected to selector switch 60. The operator may then turn position selector switch 60 to the desired position, and, after pushing the start button, tap changer 12 will be driven in the "raise" direction to the stationary contact position corresponding to the position selected by selector switch 60.

The two electrical circuits which make up the servo loop 40 may be operated entirely on an alternating potential, if desired, instead of the direct current potentials developed across resistance means 96, by eliminating the asymmetrically conductive devices 98 and 100, and the source 42 of direct current potential. FIG. 2 illustrates an embodiment of the invention in which the servo loop 40 is operated with alternating potentials. Like reference numerals in FIGS. 1 and 2 indicate like components, with a prime mark being added where necessary to indicate modifications. The starter control 18 for tap changer drive means 14, and tap changer 12, may all be the same as hereinbefore described relative to FIG. 1.

The servo loop 40′, shown in FIG. 2, is modified by connecting terminals 11 and 13 of servo loop 40 to a source 110 of alternating potential, with the source 110 of alternating potential having first and second sections 112 and 114, respectively, which may be separate transformers having primary windings 116 and 118 connected serially to two of the alternating current conductors, such as conductors 28 and 30, and secondary windings 120 and 122 connected serially to terminals 11 and 13 of the servo loop 40′. The junction 124 of the serially connected secondary windings 120 and 122 is connected to bus 92 of tap changer position switch 66. Or, the two sources of alternating potential may be provided by a single transformer having a tapped secondary winding. The only other change required to operate servo loop 40′ on alternating current, instead of direct current, is to change the location of the raise and lower relays 68 and 70, respectively, and the location of relay contacts R1 and L1. The raise relay coil R and contact L1 are serially connected between terminals 15 and 11, with contact L1 being normally closed in this embodiment of the invention. Relay coil L and contact R1 are serially connected between terminals 19 and 13, with contact R1 being normally closed in this embodiment.

In the operation of the tap changer control system shown in FIG. 2, the operator's selector switch 60 is in position III, with terminal 76 being connected to plug-in receptacle PB10 and to contact TC10 of tap changer position switch 66 through patchcord 86. Tap changer 12 is on stationary contact position 10, indicated by contact TC10 being closed. The circuit which includes the closed contact TC10, however, is isolated from carry-over bus 90 by plug-in receptacle PB10, and is also isolated from terminals 11 and 13 of the two sources of electrical potential by open contacts PS3a and PS3b.

Assume that the operator changes selector switch 60 to select position I on the selector switch, which corresponds to terminal 72. Terminal 72 is, in this instance, connected to plug-in receptacle PB2, associated contact TC2, and tap changer stationary contact position 2. Contacts PS3a and PS3b will close and contacts PS1a and PS1b will open, immediately establishing a complete circuit, which includes the voltage of secondary winding 122. This electrical circuit is completed from terminal 110, through closed contact TC10, through plug-in receptacle PB10 and patchcord 86 to terminal 76, through contacts PS3b, PS4a and PS4b of selector switch 60 and through relay coil L and normally closed contact R1 to terminal 13. Relay coil R is isolated by the open contacts PS1a and PS1b of selector switch 60. When relay coil L is energized, its contact L1 opens which further isolates relay coil R, contact L2 closes connecting carryover bus 90 to terminal 19, and contact L3, disposed in the starter control 18, closes, energizing starter coil LM which drives tap changer drive motor 14 in the "lower" direction. When the tap changer movable contact member reaches tap position TC9, the circuit through relay coil L is maintained through the carry-over bus 90. At stationary contact position 6, the circuit, which includes relay coil L, is maintained through selector switch 60. When stationary contact position 2 is reached, the circuit through relay coil L is broken, due to the open contacts PS1a and PS1b disposed on each side of terminal 72.

If the operator had selected position IV, which corresponds to terminal 78 of selector switch 60, instead of the position I, contacts PS4a and PS4b would open, and contacts PS3a and PS3b would close, which would complete a circuit which includes the voltage of secondary winding 120 and relay coil R. When relay coil R is energized, contact R1 opens, isolating relay coil L between open contact R1 and open contact PS4b, contact R2 closes connecting carry-over bus 90 to terminal 15, and contact R3 closes, energizing starter relay coil RM and driving tap changer 12 in the "raise" direction until stationary contact position 16 is reached. At this point, the circuit is broken by the open contacts PS4a and PS4b.

The changing of the patchcords 64 to different plug-in receptacles is accomplished in this embodiment as hereinbefore described relative to the embodiment shown in FIG. 1.

The tap changer control system is compatible with computer operation of tap changer 12, with FIG. 3 illustrating an embodiment of the invention in which tap changer 12 may be controlled by an operator, or a computer. FIG. 3 also includes apparatus necessary to effect a smooth transition from operator to computer control and from computer control to operator control. Like reference numerals in FIGS. 2 and 3 refer to like components. The computer is indicated by dotted outline 130 in FIG. 3, and, as will be seen hereinafter explained, it may select any tap between and including tap position 1 and the tap position selected by the operator's position selector switch 60. Computer 130 includes contacts CL, CLO, and CLR. When computer 130 is not controlling the operation of the tap changer, the computer contacts are in the condition shown in FIG. 3, with contacts CLR and CL being open, and contact CLO being closed.

The changes necessary to incorporate computer control into the tap changer control system shown in FIG. 2, include additional contacts PS6, PS7, PSR, PSI, PSII, PSIII and PSIV on position selector switch 60, a relay 140 having a coil S and contacts S1 and S2, a relay 142 having a coil BL and contact BL1, an additional contact R4 on the "raise" relay 68, a relocation of the "lower" relay 70, and its L2 contact, changes in the starter control 18' for the tap change drive motor 14 and the addition of the computer contacts hereinbefore mentioned.

More specifically, contact R2 of relay 68 is connected to terminal 80 of position selector switch 60; normally open contact PS6 of selector switch 60 is connected in series with the first patchcord 82 between terminals 144 and 72; and, normally closed contact PS7 of selector switch 60 is connected serially with relay coil S of additional relay 140 and the normally closed contact L2 of relay 70, between terminals 144 and 11. Contact R2 of relay 68, in addition to being connected to terminal 80 of selector switch 60, is also connected to terminal 144 through normally open contact S1 of relay 140. Relay coil L of relay 70 and normally closed contact R1 of relay 68 are serially connected from contact PS4b of selector switch 60 to terminal 19. Relay coil BL of relay 142 and contact R4 of relay 68 are serially connected from carry-over bus 90 to terminal 19. The normally open computer contact CLR is connected from bus 92 of tap changer position switch 66 to the junction 148 between coil R of relay 68 and contact PS5a of selector switch 60.

The remaining computer contacts, contact S2 of relay 140, and contact BL1 of relay 142 are connected in the starter control 18'. Normally closed computer contact CLO is connected to contact R3 at junction 150, and to conductor 35; normally open contacts S2 and CL are connected serially at junction 152, and the series circuit is connected across contact L3; and, normally open contact BL1 is connected between junction 150 and 152.

First, the operation of the tap changer control system 10" shown in FIG. 3 will be described relative to operator control by the selector switch 60. Table I, shown below, indicates which contacts of selector switch 60 are closed in each position of the operator selector switch 60.

TABLE I.—POSITION SELECTOR SWITCH

| Contact | Position | | | | |
|---|---|---|---|---|---|
| | Reset | I | II | III | IV |
| PS1a | X | | X | X | X |
| PS1b | X | | X | X | X |
| PS2a | X | X | | X | X |
| PS2b | X | X | | X | X |
| PS3a | X | X | X | | X |
| PS3b | X | X | X | | X |
| PS4a | X | X | X | X | |
| PS4b | X | X | X | X | |
| PS5a | | X | X | X | X |
| PS5b | | X | X | X | X |
| PS6 | X | X | | | |
| PS7 | | | X | X | X |
| PSR | X | | | | |
| PSI | | X | | | |
| PSII | | | X | | |
| PSIII | | | | X | |
| PSIV | | | | | X |

As shown in FIG. 3, contacts PS3a and PS3b of selector switch 60 are open, indicating the selector switch is on positon III, corresponding to terminal 76 which is connected to plug-in receptacle PB9 and contact TC9 of tap changer position switch 66. Tap changer 12 has its movable contact member 21 on stationary contact position 9, indicated by contact TC9 being closed. Thus, the circuit through closed contact TC9 is isolated from carry-over bus 90 by plug-in receptacle PB9, and is isolated in selector switch 60 by open contacts PS3a and PS3b.

Assume the operator changes selector switch 60 to position I, which, as shown in Table I, closes contact PS6, and all other contacts of selector switch 60 except PS1a, PS1b, PS7, PSR, PSII, PSIII, and PSIV, connecting terminal 72 to plug-in receptacle PB4 of patchboard 62, and to contact TC4 of tap changer position switch 66. A complete circuit is then established from terminal 110 through contact TC9 and selector switch 60, and through relay coil L of relay 70, which opens contacts L1 and L2, and closes contact L3 in starter 18', which drives the tap changer drive motor in the "lower" direction. When the movable contact member of the tap changer 12 reaches stationary contact position 8, the circuit is maintained through contact TC8, carry-over bus 90, coil BL of relay 142, and contact R4, which closes contact BL1 in starter 18', maintaining the circuit through coil LM of motor relay 32 through closed computer contact CLO, and closed contact S2. The same applies when TC6, and TC5 are closed. When tap position 4 is reached, the circuit will be isolated from carry-over bus 90 and isolated in selector switch 60 by open contacts PS1a and PS1b.

Assuming the tap changer is on position I on selector switch 60, which corresponds to stationary contact 4 on the tap changer, and the operator switches selector switch 60 to position IV, which in this instance is connected to plug-in receptacle PB14 and contact TC14 of tap changer position switch 66. As shown in Table I, all contacts of selector switch 60 will then be closed except PS4a, PS4b, PS6, PSR, PSI, PSII, and PSIII. A circuit will then be established through contact TC4, contact PS7, and coil S of relay 140, which closes contact S1 and opens contact S2. When contact S1 closes, relay coil R of relay 68 is energized, opening contacts R1 and R4, isolating relay coil L and BL, closing contact R2, to connect carry-over bus 90 into the circuit, and closing contact R3, to energize the motor starter relay coil RM of relay 34, and drive tap changer 12 to a stationary contact associated with a higher tap voltage. When the tap changer engages stationary contacts not associated with a patchcord location on the patchboard 62, the circuit through relay coil R is maintained by contact R2, as tap changer position switch 66 operates in closed transition. When tap position 14 is reached, the circuit is isolated, which de-energizes relay coils R and RM, stopping the drive on stationary contact position 14.

The function of relay 142 is to provide transition from computer control to operator control. It automatically moves the tap changer 12 to a patchboard selection on patchboard 62 in the event the computer 130 is taken out of service after having selected a tap position not associated with a patchcord. Relay 142 drives the tap changer in the "lower" direction to the first stationary contact which is associated with a patchcord on patchboard 62. Once reaching the first lower patchcord position, if it is not the selected position, the normal operation of the servo loop 40" will drive tap changer 12 to the selected position.

More specifically, assume operator's selector switch 60 is on position IV, and computer 130 is taken out of service after having driven the tap changer to stationary contact position 11. Thus, contact TC11 will be connected to carry-over bus 90, energizing coil BL of relay 142, causing contact BL1 in starter control 18' to close. While computer 130 is operating, computer contact CLO is open, therefore the energization of relay coil BL has no effect, as contact BL1 is isolated. When computer 130 is taken out of service, contact CLO closes, and the energization of relay coil BL thus completes a circuit through relay coil LM of relay 32, driving the movable contact member 21 of tap changer 12 in the "lower" direction. Upon reaching the first patchcord position in the "lower" direction, relay coil BL will be de-energized, and the tap changer will be driven to the tap position selected by selector switch 60, either by relay coil R or by relay coil L, if the selected position is different than the positon to which the tap changer was driven by relay 142.

Operation of tap changer control system 10" by computer 130 will now be described. Assume that computer 130 is switched to "demand control" by switching means (not shown) and the condition of the particular load connected to the tap changer requires the tap changer to reduce power and therefore voltage magnitude. Computer contact CLO opens to lock out relay coil RM, and thus prevent the tap changer drive from being driven in the "raise" direction. Computer contact CL closes, energizing relay coil LM of relay 32, driving the tap changer in the "lower" direction. Computer contact CLR closes, energizing relay coil R of relay 68, in order to close contact R2 and provide a holding circuit to carry-over bus 90, preparatory to going in the "raise" direction when the computer no longer demands a "lower" tap voltage. Contact R3 will also close when relay coil R is energized, but it does not energize relay coil RM in the starter control 18' due to the open computer contact CLO. The holding circuit through contact R2 is from terminal 124, through the closed contact of tap position switch 66, to carry-over bus 90, through R2, through contact PS5a of selector switch 60, through coil R of relay 68 to terminal 11. When the tap changer is driven to a patchcord position, the circuit goes through the patchcord and through selector twitch 60 to terminal 148. The contacts of selector switch 60 associated with patchcord positions which are passed as the tap changer moves in the "lower" direction will always be closed, as the computer will not advance the tap changer to a stationary contact position higher than that selected by operators' selector switch 60.

When a lower numbered stationary contact position of the tap changer 12 is reached that satisfies the computer, the computer contact CL will open, which stops tap changer drive 14. Computer contact CLO remains open, preventing servo loop 40" from sending tap changer 12 in the "raise" direction to the position selected by selector switch 60.

If tap changer 12 is driven by the computer in the "lower" direction all the way to tap position 1, the function of relay 140 is brought into play, stopping tap changer drive 14. When tap changer 12 reaches stationary contact position 1, coil S of relay 140 is energized which opens contact S2 in starter 18', deenergizing coil LM of relay 32. Contact PS6 on selector switch 60 is open on all positions of selector switch 60 other than "reset" and position I, as shown in Table I, in order to prevent a false circuit through coil S of relay 140 when coil R of relay 68 is normally energized, during operator control. While the tap changer is under operator control, when going from the "reset" position on selector switch 60 to a higher position on selector switch 60, relay coil S will be energized when the tap changer reaches the tap position selected by patchcord 82, closing contact S1 to maintain the circuit while the tap changer is passing the point selected by patchcord 82.

If, when the tap changer system is on computer control, the computer calls for the tap changer to advance to a stationary contact position higher than the existing position, computer contact CLO will close which energizes coil RM of relay 34, driving the tap changer 12 in the "raise" direction. If the normally closed contact R5 of raise relay 68, which is connected to computer 130, is closed, indicating relay 68 is deenergized, and computer contact CLO closes, indicating that the power controlled by tap changer 12 should be increased, then computer contact CLR will close to energize relay 68 and close contact R2 to provide a holding circuit through carry-over bus 90. When relay 68 is energized, contacts R1 and R4 will open, contact R3 will close, contact R5 will open, and computer contact CLR will also open. The circuit is thus maintained through contact R2 and through coil R of relay 68 when on a tap position not selected by the patchcords 64, and through selector switch 60 and relay coil R when the tap changer is on a patchcord selection.

The computer 130 will not raise the tap changer to a tap position higher than that selected by the operator's control switch 60, with contacts PSR, PSI, PSII, PSIII and PCIV on selector switch 60 being connected to computer 130 to advise the computer 130 of the operator's selection. As shown in Table I, contacts PSR, PSI, PSII, PSIII and PSIV are responsive to the reset position, and positions I, II, III and IV, respectively, closing only when the selector switch 60 is on its associated position.

If the tap changer is under computer control, and the operator for some reason selects a tap position lower than that selected by computer 130, by turning selector switch 60 to select a lower stationary contact position, a circuit in the computer 130 will be activated by one of the contacts PSR, PSI, PSII, PSIII or PSIV, advising the computer to energize the tap changer 12 in the "lower" direction, by closing computer contact CL, opening contact CLO, and closing computer contact CLR, as hereinbefore described, until reaching the lower tap position selected by the operator's selector switch 60. If tap changer 12 is under computer control and the operator turns the selector switch to a higher position, it will not immediately affect the tap changer, unless the computer had already been operating at the previous tap position selected by selector switch 60 and it desires to operate at a higher tap position.

While the various embodiments of the invention shown and described herein show a reset position on the operator's selector switch, it is to be understood that the reset position may be eliminated, with all of the positions on the operator's selector switch being connected to a patchcord. For example, the operator could open the control circuit breaker (not shown), move the patchcords to the desired new positions, and a momentary make push-button could be connected across L2 of FIG. 2 to drive the tap changer to the next lower patchcord position, in the event the tap changer was not on a patchcord position after the change. Once reaching a patchcord position, the servo would operate to drive the tap changer to the selected position.

It will also be understood that the operator's selector switch may have any desired number of positions, and that the tap changer may have any desired number of stationary contact positions, as required by the particular application.

In summary, there has been shown a new and improved tap changer control system which may be operated from a direct current potential, or an alternating current potential, and which lends itself to both operator and computer control. The control system requires only inexpensive switches and relays, which provides a low cost, yet reliable system, and the control system has the intelligence of knowing in which direction to drive the tap changer to make a change ordered by an operator, or by a computer, and the control system will automatically stop the tap changer when the desired tap position is reached.

Since numerous changes may be made in the above-described apparatus and different embodiments of the invention may be made without departing from the spirit thereof, it is intended that all matter contained in the foregoing description or shown in the accompanying drawings shall be interpreted as illustrative and not in a limiting sense.

We claim as our invention:

1. A control system for tap changer apparatus comprising:
    first and second electrical potentials having a common terminal,
    tape changer means having a plurality of stationary contact positions and movable contact means,
    reversible drive means for actuating said movable contact means to successively engage said stationary contact positions,
    first switch means having a plurality of normally open contacts, one of which is responsive to each stationary contact position of said tap changer means, closing when said movable contact means engages its associated stationary contact,
    means connecting the normally open contacts of said first switch means to the common terminal of said first and second electrical potentials,
    patchboard means having a plurality of plug-in receptacles, one of each of said plug-in receptacles being connected to one of the normally open contacts of said first switch means,
    second switch means for selecting which stationary contact of said tap changer means the movable contact means should engage, said second switch means having a plurality of serially connected positions, with one side of the series circuit being connected to said first electrical potential, and the other side being connected to said second electrical potential, each of the positions of said second switch means having two normally closed contacts separated by a terminal, the normally closed contacts associated with each terminal being open only when said second switch means selects its associated position,
    means removably connecting certain of the terminals of said second switch means with predetermined plug-in receptacles of said patchboard means,
    a first circuit being completed when said second switch means selects a stationary contact of said tap changer means on a first predetermined side of the position of the movable contact means of said tap changer means, said first circuit including said first electrical potential, said first switch means, said patchboard means, and said second switch means,
    first relay means disposed in said first circuit which actuates said drive means in a first predetermined direction, said first relay means maintaining said first electrical circuit from said patchboard means to said first electrical potential when the movable contact means of said tap changer means engages stationary contact positions not associated with a plug-in receptacle connected to said second switch means,
    said first circuit being broken by the contacts associated with the selected position of said second switch means when the movable contact means of said tap changer means engages the selected stationary contact position,
    a second circuit being completed when said second switch means selects a stationary contact of said tap changer means on the side of the position of the movable contact means of said tap changer means opposite the first predetermined side, said second circuit including said second electrical potential, said first switch means, said patchboard means, and said second switch means,
    second relay means disposed in said second circuit which actuates said drive means in a direction opposite said first predetermined direction, said second relay means maintaining said second electrical circuit from said patchboard means to said second electrical potential when the movable contact means of said tap changer means engages stationary contact positions not associated with a plug-in receptacle connected to said second switch means, said second electrical circuit being broken by the contacts associated with the selected position on said second switch means when the movable contact means of said tap changer means engages the selected stationary contact position.

2. The control system of claim 1 wherein said first and second electrical potentials are direct current potentials and including first and second asymmetrically conductive devices, the means connecting the normally open contacts of said first switch means to the common terminal of said first and second electrical potentials including first and second parallel connected circuits, said first parallel circuit comprising said first relay means and said first asymmetrically conductive device poled in a first direction, said second parallel circuit comprising said second relay means and said second asymmetrically conductive device poled in a direction opposite said first direction.

3. The control system of claim 1 wherein said first and second electrical potentials are alternating potentials, with said first relay means being connected between said first alternating potential and said second switch means, and said second relay means being connected between said second alternating potential and said second switch means.

4. The control system of claim 1 wherein the plug-in receptacle of said patchboard means each have a first contact removably connected to a common bus which has first and second ends, said means which connects the terminals of said second switch means to predetermined plug-in receptacles connecting the first contact of said plug-in receptacle to a terminal of said second switch means and breaking the connection of the first contact with the common bus, said first relay means having a contact connected between the first end of said common bus and said first potential which closes when said first relay means is energized, to maintain the first circuit through the common bus when the first circuit is not being completed through said second switch means, said second relay means having a contact connected between the second end of said common bus and said second electrical potential which closes when said second relay means is energized, to maintain the second circuit when the second circoit is not being completed through said second switch means.

5. The control system of claim 1 including a computer for controlling said tap changer means, third relay means for actuating said tap changer drive means in a predetermined direction to the first stationary contact position in the predetermined direction associated with a position on said second switch means, when changing from computer control to control by said second switch means.

6. The control system of claim 5 including fourth relay means connected to deactivate said tap changer drive means when said computer drives the movable contact means of said tap changer means to the stationary contact position associated with the position on said second switch means which is nearest the first end of the series circuit of said second switch means.

7. A control system for tap changer apparatus comprising:

tap changer means having a plurality of stationary contact positions and movable contact means which is operably connected to at least one of said plurality of stationary contact positions, drive means for driving the movable contact means of said tap changer means in either of two directions to change the stationary contact position that is engaged with said movable contact means, a source of electrical potential having first, second and third terminals, with said third terminal being disposed between said first and second terminals, tap changer position switch means having a plurality of normally open contacts each having first and second ends, one of each of said normally open contacts being associated with and responsive to each stationary contact position of said tap changer means, said normally open contacts being closed when the movable contact means of said tap changer is engaged with its associated stationary contact position, patchboard means having a plurality of plug-in receptacles each having a first contact removably connected to a common bus, said common bus having first and second ends, certain of the normally open contacts of said tap changer position switch means each having their first ends connected to the first contact of one of said plug-in receptacles of said patchboard means, means connecting the second ends of the normally open contacts of said tap changer position switch means to the third terminal of said source of electrical potential, selector switch means for selecting the stationary contact position of said tap changer means which is to be engaged by said movable contact means, said selector switch means comprising a series circuit having first and second ends, said series circuit having a plurality of serially connected positions, with each position comprising two serially connected normally closed contacts separated by a terminal, the normally closed contacts of a position being open when said selector switch means selects that position, means connecting the first end of the series circuit of said selector switch means to the first terminal of said source of electrical potential, means connecting the second end of the series circuit of said selector switch mean to the second terminal of said source of electrical potential, patchcord means removably connecting certain terminals of said selector switch means with predetermined plug-in receptacles of said patchboard means, electrically connecting the terminals of said selector switch means with the first contact of the selected plug-in receptacle, and breaking the connection between the first contact of the selected plug-in receptacle and the common bus of said patchboard means, a first electrical circuit being formed when said selector switch selects a tap position on said tap changer means on a first predetermined side of the engaged contact position, said first electrical circuit including the closed contact of said tap changer position switch means associated with the engaged stationary contact position, said patchboard means, said patchcord means, said selector switch means, and the first and third terminals of said source of potential, first relay means disposed in said first electrical circuit which actuates said drive means in a first predetermined direction, and which connects the first end of the common bus of said patchboard means to the first end of the series circuit of said selector switch means, maintaining said first electrical circuit when engaged stationary contact positions are associated with plug-in receptacles which have their first contacts connected to said common bus, said first electrical circuit being broken by the open contacts of the selected position on said selector switch means when the engaged stationary contact position of said tap changer means is the tap position selected by said selector switch means, a second electrical circuit being formed when said selector switch means select a stationary contact position on said tap changer means on the side of the engaged stationary contact position opposite said first predetermined side, said second electrical circuit including the closed contact of said tap changer position switch means associated with the engaged stationary contact position, said patchboard means, said patchcord means, said switch means, and the second and third terminals of said source of electrical potential, and second relay means disposed in said second electrical circuit which actuates said drive means in a direction opposite to said first predetermined direction, and which connects the second end of the common bus of said patchboard means to the second end of the series circuit of said selector switch means, maintaining said second electrical circuit when engaged stationary contact positions are associated with plug-in receptacles which have their first contacts connected to said common bus, said second electrical circuit being broken by the open contacts of the selected position on said selector switch means when the engaged stationary contact position of said tap changer means is the tap position selected by said selector switch means.

8. The control system of claim 7 wherein said source of electrical potential is a direct current potential, and including first and second asymmetrically conductive devices, the means connecting the normally open contacts of said tap changer position switch means to the third terminal of said source of electrical potential including first and second parallel connected circuits, said first parallel circuit comprising said first relay means and said first asymmetrically conductive device poled in a first predetermined direction, said second parallel circuit comprising said second relay means and said second asymmetrically conductive device poled in a direction opposite to said first direction.

9. The control system of claim 7 wherein said source of electrical potential is an alternating potential, with said first relay means being connected between the first terminal of said source of electrical potential and the first end of the series circuit of said selector switch means, and said second relay means being connected between the second terminal of said source of electrical potential and the second end of the series circuit of said selector switch means.

10. The control system of claim 7 including a computer for controlling said tap changer means, third relay means for actuating said tap changer drive means in a predetermined direction to the first stationary contact position in that direction associated with a position on said selector switch means when changing from computer control to control by said selector switch means, and fourth relay means connected to deactivate said tap changer drive means when said computer drives the movable contact means of said tap changer means to the stationary contact position associated with the position on said selector switch means which is nearest the first end of the series circuit of said selector switch means.

References Cited

UNITED STATES PATENTS

| | | | |
|---|---|---|---|
| 2,754,471 | 7/1956 | Mayer | 323—43.5 |
| 3,089,989 | 5/1963 | Rave | 318—28 |
| 3,161,820 | 12/1964 | Chumakov | 323—43.5 XR |
| 3,238,441 | 3/1966 | Gucker | 323—43.5 |
| 3,345,556 | 10/1967 | Schmeling et al. | 323—43.5 |

BENJAMIN DOBECK, *Primary Examiner.*

U.S. Cl. X.R.

323—43.5